Patented Jan. 23, 1940

2,188,280

UNITED STATES PATENT OFFICE

2,188,280
ACCELERATOR OF VULCANIZATION

Joy G. Lichty, Stow, Ohio, assignor to Wingfoot Corporation, Wilmington, Del., a corporation of Delaware No Drawing. Application November 27, 1934, Serial No. 755,022. In Canada November 14, 1932

20 Claims. (Cl. 260—793)

This invention relates to a new class of compounds the members of which are valuable either as such or with other substances, in the vulcanization of rubber. It relates, among other things, to a method of accelerating the processes of vulcanization by incorporating in the unvulcanized stock certain chemical compounds which not only are comparatively easy to prepare but also impart desirable physical properties to the vulcanized products. The compounds with which the invention deals are new in themselves and may be described as hydrocarbon oxy carbonyl alkyl esters of dithiocarbamic acids.

Illustrative of the compounds which the invention concerns is the type formula

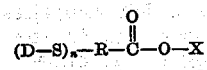

wherein X is a hydrocarbon radical such as an ethyl, benzyl, p-chlor phenyl or phenyl radical, D is an N-substituted thio carbamyl group, $n$ is one or two and R is a substituted methane group. In general, these compounds are prepared by reacting an ester of an alpha halogen-substituted fatty acid with a soluble salt of an N-substituted dithiocarbamate. Usually it is necessary only to bring together solutions of these two reagents. In some cases, however, it may be necessary to allow the mixture of the solutions to stand for a few hours or to heat this mixture slightly. In any case the product forms as a solid or oil which may be easily separated and purified. The reaction is found to proceed with substantially equal facility with either a mono or di halogenated fatty acid ester.

In the formula given above, R represents any substituted methane group. Where the fatty acid employed is acetic acid, R is —CH₂— or =CH—; similarly, where butyric acid, for instance, is employed, R is a propyl group such as =HC—C₂H₅ or ≡C—C₂H₅

It will be noted that for R to be a substituted methane group the one or two halogen atoms are attached to the carbon atom alpha to the carbonyl group of the halogenated fatty acid ester. It will also be understood that X may be a substituted hydrocarbon radical as well as an unsubstituted hydrocarbon radical. In the type formula, D is more specifically the group

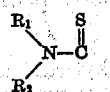

In the latter group, R₁ and R₂ may be like or unlike radicals or, if desired, R₁ and R₂ may be taken together to form a cyclic alkylene chain which may, if desired, be interrupted by an oxygen or sulphur atom. Also, either R₁ or R₂, but not both, may be hydrogen.

Illustrative of the preparation of these compounds is that of ethyl carboxy methyl di(diethyl dithiocarbamate) which may be prepared by refluxing on a steam bath for approximately two hours a mixture containing 39.3 grams (¼ mol) of ethyl dichloro acetate, 444 grams of an aqueous solution containing ½ mol of sodium diethyl dithiocarbamate, and 200 cc. of acetone. After the reflux period the acetone is removed by distillation. The lower layer of colorless liquid formed may be separated by means of a funnel and dried in a vcauum desiccator. The yield is approximately 77%. The reaction involved is believed to be as follows:

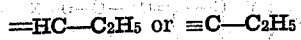

In the preparation of ethyl carboxy methyl di(dimethyl dithiocarbamate) a mixture containing ¼ mol of ethyl dichloroacetate, ½ mol of sodium dimethyl-dithiocarbamate in aqueous solution and 200 cc. of acetone is refluxed for one half hour. The product is cooled and the solid removed by filtration. The yield is about 66%. When recrystallized from a solution of chloroform and alcohol, the product melts at 178 degrees C. The reaction is believed to be as follows:

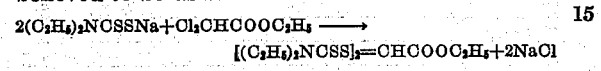

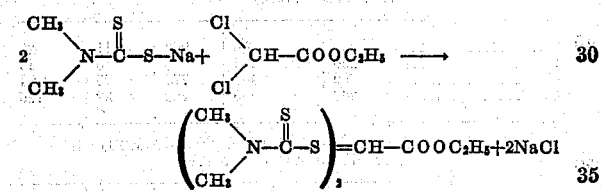

Other compounds of the invention are ethyl carboxy methyl penta methylene dithiocarbamate, ethyl carboxy methyl di(penta methylene dithiocarbamate), methyl carboxy methyl dibutyl dithiocarbamate, methyl carboxy methyl di(di iso butyl dithiocarbamate), butyl carboxy methyl diethyl dithiocarbamate, butyl carboxy methyl N-methyl cyclohexyl dithiocarbamate, butyl carboxy methyl di(N-methyl phenyl dithiocarbamate), iso propyl carboxy methyl dibenzyl dithiocarbamate, iso propyl carboxy methyl di(di iso amyl dithiocarbamate), iso propyl carboxy methyl N-ethyl cyclohexyl dithiocarbamate, cyclohexyl carboxy methyl di(beta phenyl ethylene) dithiacarbamate; cyclohexyl carboxy methyl di(penta methylene dithiocarbamate) hexahydro tolyl carboxy methyl (di(hexahydro tolyl) dithiocarbamate, hexahydro tolyl carboxy methyl di(dibenzyl dithiocarbamate), decahydro naphthyl carboxy methyl di(diethyl dithiocarbamate); benzyl carboxy methyl di(di tetrahydro-alpha furfuryl dithiocarbamate); beta phenyl ethylene carboxy methyl di(dimethyl dithiocarbamate), isobutyl carboxy methyl di(dicyclohexyl dithiocarbamate), iso amyl carboxy methyl di(penta methylene dithiocarbamate), iso amyl carboxy methyl penta methylene dithiocarbamate, phenyl carboxy methyl di(diethyl dithiocarbamate), naphthyl carboxy methyl di(penta methylene dithiocarbamate, o, m, or p-nitro phenyl carboxy methyl di(dicyclohexyl dithiocarbamate), o, m, or p-methyl phenyl carboxy methyl di(dibenzyl dithiocarbamate), o, m, or p-ethoxy phenyl carboxy methyl di(dibenzyl dithiocarbamate), o, m, or p-ethoxy phenyl carboxy methyl di(di amyl dithiocarbamate), and o, m, or p-methoxy phenyl carboxy methyl di,dibenzyl dithiocarbamate). Others are ethyl alpha carboxy propyl penta methylene dithiocarbamate, ethyl alpha carboxy propyl di(dibutyl dithiocarbamate), benzyl alpha carboxy propyl diethyl dithiocarbamate, cyclohexyl alpha carboxy propyl di(dibenzyl dithiocarbamate), methyl alpha carboxy propyl dicyclohexyl dithiocarbamate, butyl alpha carboxy propyl dimethyl dithiocarbamate, and the like.

The compounds to which the invention relates may be employed as accelerators of vulcanization in substantially any of the standard rubber formulae, one found particularly satisfactory being the following:

|  | Parts by weight |
|---|---|
| Extracted pale crepe rubber | 100 |
| Zinc oxide | 5 |
| Sulphur | 3 |
| Stearic acid | 1.5 |
| Accelerator | 0.5 |

After vulcanization, physical tests on stocks so made up gave the following results:

| Cure | | Ult. tens. in kgs./cm.² | Max. elong. in percent | Stress in kgs./cm.² at— | |
|---|---|---|---|---|---|
| Time in minutes | Temp., °F. | | | .500% elong. | .700% elong. |

ETHYL CARBOXY METHYL DI(DIETHYL DITHIOCARBAMATE)

| 20 | 260 | 75 | 900 | 11 | 26 |
| 25 | 260 | 104 | 845 | 15 | 43 |
| 40 | 260 | 148 | 775 | 25 | 94 |
| 60 | 260 | 185 | 760 | 32 | 126 |

ETHYL CARBOXY METHYL DI(DIMETHYL DITHIOCARBAMATE)

| 15 | 260 | 52 | 875 | 8 | 20 |
| 20 | 260 | 108 | 845 | 15 | 45 |
| 30 | 260 | 156 | 780 | 24 | 95 |
| 40 | 260 | 172 | 720 | 38 | 154 |

These compounds, new in themselves, possess valuable properties as accelerators of vulcanization. They may be employed either by themselves or in conjunction with other basic organic nitrogen-containing accelerators, such as diphenylguanidine, diortho tolyl guanidine, crotonylidene aniline, diphenylguanidine oxalate, diphenylguanidine succinate and the like. In general, the dihalogen fatty acid derivatives of the dithiocarbamates are more powerful than the mono halogen derivatives. Consequently with the dihalogen derivatives, activators will not usually be necessary, although they may be found desirable in certain instances. With the mono halogen derivatives, on the other hand, activators are in most cases desirable, although not invariably necessary.

This application is, in part, a continuation of application Serial No. 603,454, filed April 5, 1932, now Patent No. 2,067,494.

It is intended that the application shall cover, by suitable expression in the appended claims, all features of patentable novelty residing in the invention.

What I claim is:

1. The process which comprises vulcanizing a vulcanizable rubber mix in the presence of ethyl carboxy methyl di(diethyl dithiocarbamate).

2. The process which comprises vulcanizing a vulcanizable rubber mix in the presence of ethyl carboxy methyl di(dimethyl dithiocarbamate).

3. The process which comprises vulcanizing a vulcanizable rubber mix in the presence of an ethyl carboxy methyl di(dialkyl dithiocarbamate).

4. The process which comprises vulcanizing a vulcanizable rubber mix in the presence of a hydrocarbon oxy carbonyl methyl ester of a dithiocarbamic acid.

5. The process which comprises vulcanizing a vulcanizable rubber mix in the presence of a compound having the formula

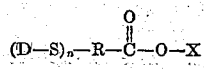

wherein X is a hydrocarbon radical, D is an N-substituted thiocarbamyl group, R is selected from the group consisting of methane radicals and hydrocarbon substituted methane radicals and n is one or two.

6. The process which comprises vulcanizing a vulcanizable rubber mix in the presence of a compound having the formula

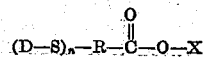

wherein X is an alkyl radical, R is selected from the group consisting of methane radicals and hydrocarbon substituted methane radicals, D is a thiocarbamyl group and n is one or two.

7. The process which comprises vulcanizing a vulcanizable rubber mix in the presence of a compound having the formula

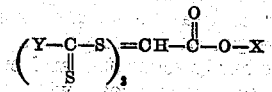

wherein Y is a tertiary aliphatic amino group and X is alkyl.

8. The process which comprises vulcanizing a vulcanizable rubber mix in the presence of a compound having the formula

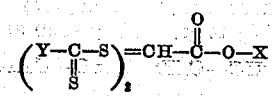

wherein Y is an aliphatic amino group and X is alkyl.

9. The process which comprises vulcanizing a vulcanizable rubber mix in the presence of a compound having the formula

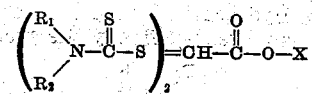

wherein X is an alkyl radical and R₁ and R₂ are selected from the group consisting of aliphatic hydrocarbon radicals and, R₁ and R₂ together, cyclic alkylene chains, cyclic oxy alkylene chains and cyclic thio alkylene chains.

10. A rubber product that has been vulcanized in the presence of ethyl carboxy methyl di(diethyl dithiocarbamate).

11. A rubber product that has been vulcanized in the presence of an alkyl carboxy methyl ester of a dialkyl dithiocarbamic acid.

12. A rubber product that has been vulcanized in the presence of an ethyl carboxy methyl di(N-alkylated dithiocarbamate).

13. A rubber product that has been vulcanized in the presence of a compound having the formula

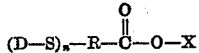

wherein X is a hydrocarbon radical, R is selected from the group consisting of methane radicals and hydrocarbon substituted methane radicals, D is a thiocarbamyl group and $n$ is one or two.

14. A rubber product that has been vulcanized in the presence of a compound having the formula

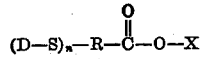

wherein X is an alkyl radical, R is selected from the group consisting of methane radicals and hydrocarbon substituted methane radicals, D is an N-substituted thiocarbamyl group and $n$ is one or two.

15. A rubber product that has been vulcanized in the presence of a compound having the formula

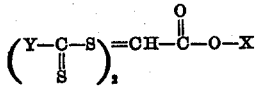

wherein Y is a tertiary aliphatic amino group and X is alkyl.

16. A rubber product that has been vulcanized in the presence of a compound having the formula

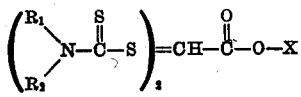

wherein X is an alkyl radical and $R_1$ and $R_2$ are selected from the group consisting of aliphatic hydrocarbon radicals and, $R_1$ and $R_2$ together, cyclic alkylene chains, cyclic oxy alkylene chains and cyclic thio alkylene chains.

17. Ethyl carboxy methyl di(diethyl dithiocarbamate).

18. A compound having the formula

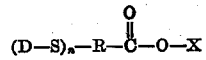

wherein X is a hydrocarbon radical, R is selected from the group consisting of methane radicals and hydrocarbon substituted methane radicals, D is a thiocarbamyl group and $n$ is one or two.

19. A compound having the formula

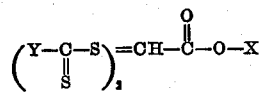

wherein Y is a tertiary aliphatic amino group and X is alkyl.

20. An alkyl carboxy methyl di(N-alkylated dithiocarbamate).

JOY G. LICHTY.